United States Patent [19]
Lee et al.

[11] Patent Number: 5,804,087
[45] Date of Patent: Sep. 8, 1998

[54] METHOD OF ADJUSTING NATURAL FREQUENCY OF DUAL-AXIS VIBRATORY STRUCTURE

[75] Inventors: Ki-bang Lee, Seoul; Young-ho Cho, Daejeon; Ci-moo Song, Sungnam, all of Rep. of Korea

[73] Assignees: Samsung Electronics Co., Ltd., Kyungki-do; Korea Advanced Institute of Science and Technology, Taejon, both of Rep. of Korea

[21] Appl. No.: 646,817

[22] Filed: May 21, 1996

[30] Foreign Application Priority Data

May 25, 1995 [KR] Rep. of Korea .................. 1995-13256

[51] Int. Cl.⁶ ................................................ H01L 22/027
[52] U.S. Cl. ............................................. 216/41; 437/228
[58] Field of Search ........................... 216/2, 41; 437/228

[56] References Cited

U.S. PATENT DOCUMENTS

| | | | |
|---|---|---|---|
| 4,699,006 | 10/1987 | Boxenhorn | 73/517 AV |
| 5,490,420 | 2/1996 | Burdess | 73/504.02 |
| 5,507,911 | 4/1996 | Greiff | 156/651.1 |

*Primary Examiner*—R. Bruce Breneman
*Assistant Examiner*—Michael Adjodha
*Attorney, Agent, or Firm*—Burns, Doane, Swecker & Mathis, L.L.P.

[57] ABSTRACT

There is provided a method of adjusting the natural frequency of a dual-axis vibratory structure having: a first spring member having a lengthwise direction coinciding to a first axis direction receiving an electrostatic force; a second spring member having a lengthwise direction coinciding to a second direction perpendicular to the first axis direction and having a width narrower than that of the first spring member; and a mass portion, the method comprising the steps of: measuring the natural frequencies relative to the first axis direction of the vibratory structure and a third axis direction perpendicular to a plane formed by the first and second axes; varying the thickness of the first spring member so as to adjust the natural frequency of the third axis direction while fixing the natural frequency of the first axis direction; and repeating the measuring step and the thickness varying step until the natural frequency of the first and third axes directions are within the scope of a permissible error. The method can be adjusted to coincide the natural frequency of the vibratory structure with a design value, so that linearity and the sensitivity of a sensor are improved and operation bandwidth increases.

7 Claims, 3 Drawing Sheets

METHOD OF ADJUSTING NATURAL FREQUENCY OF DUAL-AXIS VIBRATORY STRUCTURE

BACKGROUND OF THE INVENTION

The present invention relates to a method of adjusting the natural frequency of a dual-axis vibratory structure, and more particularly, to a method of adjusting the natural frequency of a dual-axis vibratory structure by increasing or decreasing the thickness of part of the vibratory structure through deposition or etching process.

It is a very important technology to correct the natural frequency of a dual-axis vibratory structure so that it can vibrate with a specific natural frequency, and the technology is applied to a surface acoustics wave (SAW) filter and a crystal oscillator used in a humidifier, for example. Since common crystal oscillators or SAW filters vibrate with a single vibrating mode, the natural frequency thereof can be comparatively easily adjusted by using a method of adjusting a frequency according to conventional technology. However, since a dual-axis vibratory structure oscillating with two oscillating modes is not easily adjusted with the conventional frequency adjusting method, a new method of adjusting the frequency is needed.

The uses of dual-axis vibratory structures have expanded recently. A representative one among various articles using a dual-axis vibratory structure is a gyroscope. The gyroscope can play the role of an angular velocity sensor for detecting an angular velocity or an acceleration of an inertial body and has been used as a kernel parts of a navigation device of a missile, a ship and a plane for a long time. Since the gyroscope for military affairs or planes is manufactured through a precision processing and an assembly process of several thousands of the parts, a precise performance can be obtained. However, since a manufacturing cost is high and the structure of the gyroscope is bulky, it is not proper to apply the gyroscope to home appliances for a general industry or public needs. The gyroscope used for public needs can be applied to a navigation device for detecting the acceleration and angular velocity of a car or a device for detecting the wobbling of a hand when using a high magnification camcorder to compensate for the wobble of the operator's hand. Also, a sensor incorporating a dual-axis vibratory structure is used in medical equipment or measuring instruments for industry.

FIG. 1 shows the gyroscope using the dual-axis vibratory structure schematically. The principle of the gyroscope is to detect a rotation angular velocity by detecting a Coriolis force generated in a third axis direction perpendicular to a first and a second axis direction, when the inertial body oscillating or rotating uniformly in the first axis direction receives the rotation angular velocity in the second axis direction perpendicular to the first axis direction.

A gyroscope 10 is comprised of a dual-axis vibratory structure 12 disposed on the upper portion of a silicon wafer substrate 11. Any material having a conductivity can be used as the structure 12. The structure 12 is supported on the silicon substrate 11 by a supporting portion 13 formed slightly thicker than the other portion, the other portion except the supporting portion 13 is formed thinly to be in a state spaced in a Z axis direction from the surface of the silicon substrate 11. Spring portions 14,15 and 16 and a mass portions 17 are provided in the structure 12. Driving portion 21 for oscillating the structure 12 in a X direction are disposed on both sides of the structure 12. The driving portions 21 are also formed of a conductive material. If a current is supplied to the driving portions 21 being a type of an electrode, an electrostatic force is generated in a finger 22 of driving porions 21 to thereby cause a vibrating movement from a finger 19 of the structure 12. A surface sensor electrode (not shown) capable of detecting the displacement of the Z direction of the structure 12 is disposed on the lower portion of the structure 12. The displacement of the Z direction of the structure 12 can be measured from the change of capacitance generated in the surface sensor electrode.

The angular velocity of the rotating inertial body in Y axis direction is obtained as follows. While the current is supplied to the finger 22 to generate a vibration in the X direction of the structure 12 with the electrostatic force, the frequency of the X direction is measured from a center sensor electrode 23 located at a central portion of the vibratory structure 12. Also, if the structure 12 vibrates in the Z axis direction by the Coriolis force, the frequency of the Z direction is measured from the surface sensor electrode disposed on the lower portion of the structure 12. The frequencies of the X axis direction and the Z axis direction measured as above are data-processed and thus it is possible to get the angular velocity of the rotating inertial body.

As explained above, the gyroscope 10 includes the vibratory structure provided with the silicon substrate 11 and the mass portion 17 through the springs 14,15 and 16 to the supporting portion 13 fixed thereon, and the mass portion 17 vibrates in the X-axis and Z-axis directions. Accordingly, the gyroscope 10 has a natural frequency on two axes. At this time, in order to guarantee the performance of the gyroscope, the natural frequency on a dual-axis vibration of the structure 12 should be within the range of a preset error. However, if the structure 12 is manufactured by using the conventional technology such as an etching or chemical vapor deposition process, a processing error of usually 0.1~1.0 $\mu$m appears in the manufacturing process. Due to such an error of the manufacturing process, the spring constant of the structure 12 and the mass of the mass portion 17 are considerably deviated from a design value so that the natural frequency of two axes direction differs from a desired value. Accordingly, there is a problem in that the performance of the gyroscope deteriorates. In order to solve the above problem, a method of adjusting properly the spring constant of the springs 14,15 and 16 in the structure 12 is needed.

SUMMARY OF THE INVENTION

It is an object of the present invention to provide a novel method capable of adjusting the frequency of a dual-axis vibratory structure.

It is another object of the present invention to provide a method capable of adjusting the natural frequency of one axis of the dual-axis vibratory structure while fixing the natural frequency of the other axis.

It is still another object of the present invention to provide a method capable of adjusting the natural frequency of the dual-axis vibratory structure for use in a vibratory gyroscope.

To accomplish one aspect of the above object, there is provided a method of adjusting the natural frequency of a dual-axis vibratory structure having: a first spring member having a lengthwise direction coinciding to a first axis direction receiving an electrostatic force; a second spring member having a lengthwise direction coinciding to a second direction perpendicular to the first axis direction and having a width narrower than that of the first spring member; and a mass portion, said method comprising the steps of:

measuring the natural frequencies relative to the first axis direction of the vibratory structure and a third axis direction perpendicular to a plane formed by the first and second axes;

varying the thickness of the first spring member so as to adjust the natural frequency of the third axis direction while fixing the natural frequency of the first axis direction; and repeating said measuring step and said thickness varying step until the natural frequencies of the first and third axes directions are within the scope of a permissible error.

According to another characteristic of the present invention, there is provided a method of adjusting the natural frequency of a dual-axis vibratory structure, wherein said thickness-varying step includes the step of decreasing the thickness of the first spring member, when the natural frequency of the third axis direction of the structure is higher than that of the first axis direction.

According to another characteristic of the present invention, there is provided a method of adjusting the natural frequency of a dual-axis vibratory structure, wherein said thickness-varying step includes the step of increasing the thickness of the first spring member, when the natural frequency of the third axis direction of the structure is lower than that of the first axis direction.

According to another characteristic of the present invention, there is provided a method of adjusting the natural frequency of a dual-axis vibratory structure, wherein the thickness-decreasing step is executed by one of reactive ion etching, plasma etching and sputtering.

According to another characteristic of the present invention, there is provided a method of adjusting the natural frequency of a dual-axis vibratory structure, wherein said thickness-increasing step is executed by one of sputtering deposition, ion beam sputtering deposition, electron-cyclotron-resonance sputtering deposition, ion-plating, molecular beam epitaxy, chemical vapor deposition, and metal organic chemical vapor deposition.

According to another characteristic of the present invention, there is provided a method of adjusting the natural frequency of a dual-axis vibratory structure, wherein said thickness-varying step is executed by using a mask formed with an aperture corresponding to a region for realizing a thickness variation in the first spring member and by varying the thickness of the first spring member under the aperture.

To accomplish another aspect of the present invention, there is provided a method of adjusting the natural frequency of a dual-axis vibratory structure, for use in a gyroscope, having: a first spring member of a first axis direction coinciding with the direction receiving an electrostatic force; a second spring member of a second axis direction perpendicular to the first direction having a width narrower than that of the first spring member; and a mass portion, said method comprising the steps of:

measuring the-natural frequency relative to the first axis direction and the third axis direction perpendicular to a plane formed by the first and second axes of the vibratory structure;

varying the thickness of the first spring member of the first axis direction so as to adjust the natural frequency of the third axis direction, while fixing the natural frequency of the first axis direction; and repeating said measuring step and said thickness varying step until the natural frequency of the first axis direction and the third axis direction is within the scope of a predetermined error.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
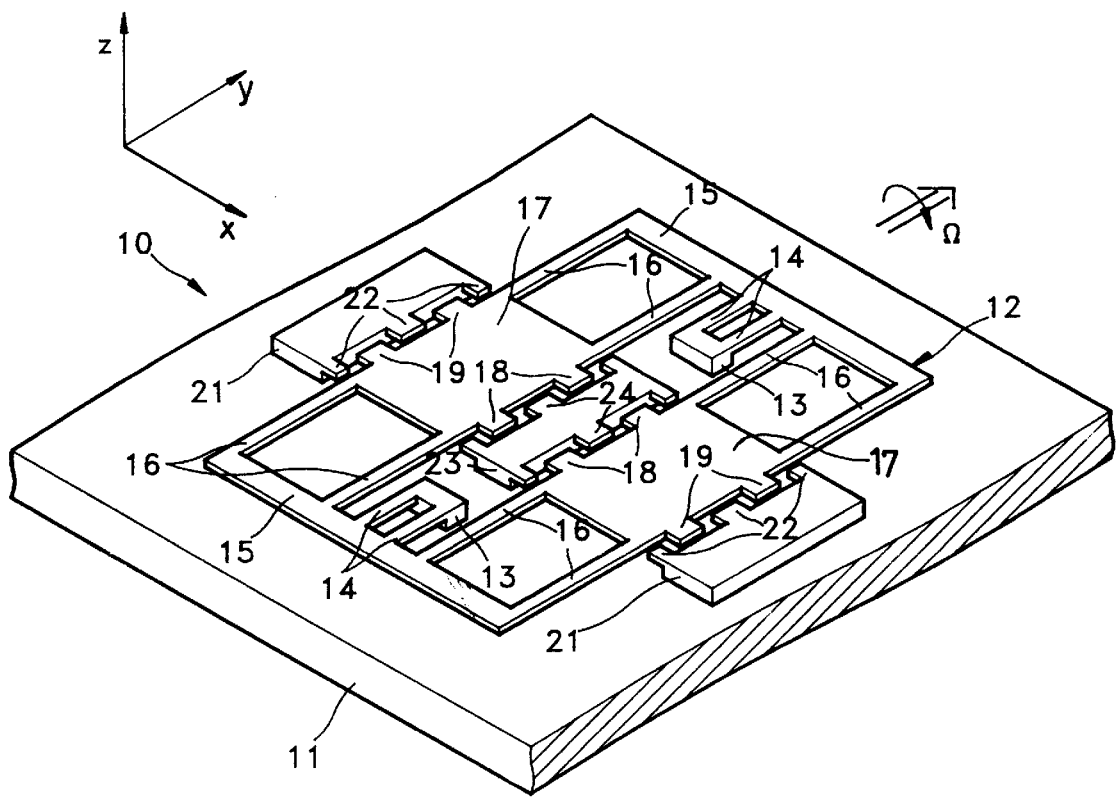
FIG. 1 is a perspective view of a dual-axis vibratory structure installed in a gyroscope according to a conventional technology.
Figure 2:
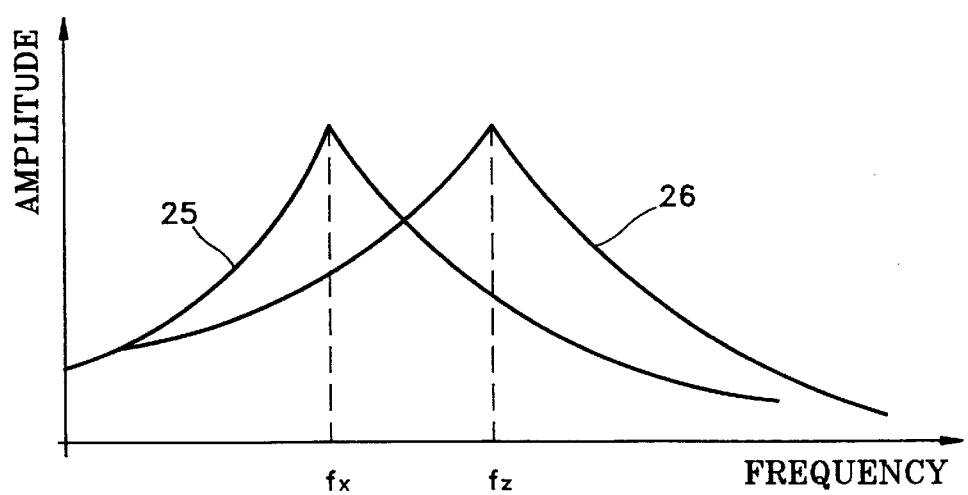
FIG. 2 is a graph showing the natural frequency of an X axis and a Y axis of the dual-axis vibratory structure in FIG. 1.

To assist understanding of the present invention, a frequency response of the dual-axis vibratory structure 12 will be described with reference to FIG. 1 and 2. In the graph of FIG. 2, there are two response curves, namely, a frequency response curve 25 of the X axis direction and a frequency response curve 26 of the Z axis direction. The natural frequencies of the vibratory structure are indicated as $f_x$ and $f_z$ relative to the X axis and the Z axis, respectively. Here, the natural frequencies $f_x$ and $f_z$ for either axis are functions of mass and the elastic modulus of a spring (spring constant), thus:

$$f_x = \frac{1}{2\pi}\sqrt{\frac{k_x}{m}} , f_z = \frac{1}{2\pi}\sqrt{\frac{k_z}{m}}$$

where $k_x$ and $k_z$ are equivalent spring constants (for one and the other axis directions) of the spring portions 14,15 and 16, and m is the mass of the mass portion 17. Here, though the true value of m would be equal to the total mass of the mass portion 17 and the spring portions 14, 15 and 16, mass m can be taken as the mass of the mass portion 17 only, since the collective mass of the spring portions is generally regarded as negligible in comparison with that of the mass portion itself.

Generally the dual-axis vibratory structure includes a spring portion 15 having a wide width in one direction where the electrostatic force is applied by a driving electrode, while the vibratory structure includes the spring portions 14 and 16 having narrow widths in the other direction. If the thickness of the spring portions 14, 15 and 16 varies, the spring constants relative to the X axis and the Z axis also vary.

In order to secure the performance of the dual-axis vibratory structure 12, an adjustment should be performed to vary the Z-axis natural frequency $f_z$ while fixing the natural frequency $f_x$ of the X direction. However, in consideration of the shape of the structure 12 shown in FIG. 1, if the thickness of the (narrow) spring portions 14 or 16 varies, there is a problem in that the spring constants of both directions vary together. On the other hand, if the thickness of the (wide) spring portion 15 varies, only the Z-axis spring constants can be varied, with nearly no variation of that of the X axis direction. In the present invention, on the basis of the above point, the thickness of a spring portion 15 having a wide width varies so as to adjust the Z-axis natural frequency $f_z$, while fixing the natural frequency $f_x$ of the X direction.

Figure 3:
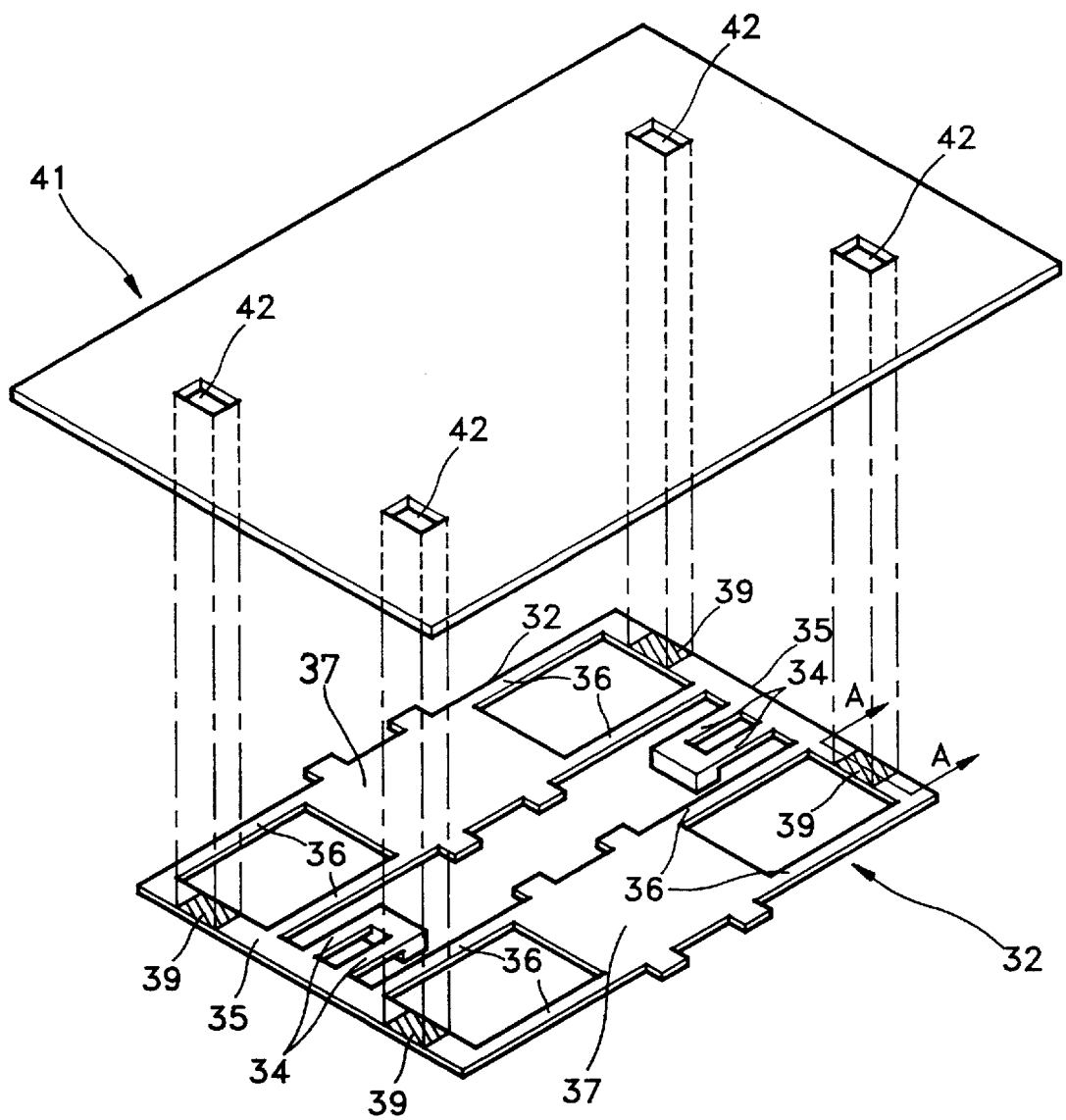
FIG. 3 is a perspective view for explaining a method of adjusting the natural frequency of a dual-axis vibratory structure, according to the present invention.
Figure 3:
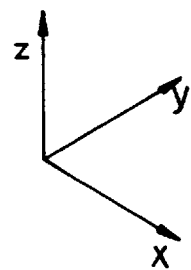
Figure 4A:
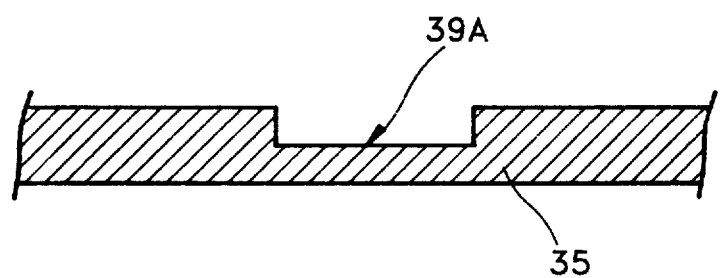
FIGS. 4A and 4B are sectional views taken along the line A-A' of FIG. 3.
Figure 4B:
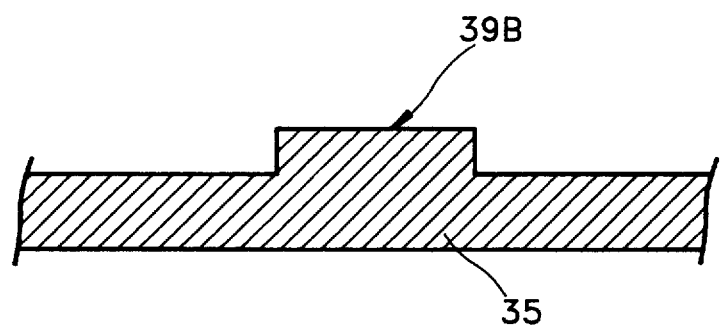

FIG. 3 is a diagram for explaining the method of adjusting the natural frequency of a dual-axis vibratory structure 32 according to the present invention. The vibratory structure 32 is provided with a spring portion 36 having a wide width in the X direction, springs 34 and 35 having narrow width in the Y direction, and a mass portion 37. The variation of the thickness of the spring portion 35 having the wide width is realized by depositing different material on a predetermined region 39 or etching part of the region 39, by using a mask 41. Widely used deposition methods include sputtering deposition, ion beam deposition, electron-cyclotron-resonance sputtering deposition, ion plating deposition, atom beam epitaxy, chemical vapor deposition, and metal organic chemical vapor deposition. The part of the spring portion can be removed by reactive ion etching (widely used in semiconductor processing). For example, with a pressure of about 0.01~0.10 Torr, if $CF_4$ gas is used, the etching can be realized at a speed of 0.05~1.00 µm per minute. Besides reactive ion etching, the thickness of the spring portion 35 can be varied using plasma etching or sputtering etching. The mask 41 has a plurality of apertures 42 formed to correspond to the region 39 needed to vary the thickness of the spring portion 35. FIGS. 4A and 4B show the cross-section taken along the line A-A' of FIG. 3. FIG. 4A shows a part 39A of the spring portion removed by etching, while FIG. 4B shows a part 39B of the spring portion risen by depositing The adjustment of the natural frequency resulting from the variation of the thickness of the spring portion 35 is carried out with a trial and error method. After the structure 32 is fabricated, the natural frequency relative to each axis direction is measured. As stated above referring to FIG. 1, the measurement of the natural frequency relative to the X axis direction is carried out by using the center sensor electrode 23 located at the central portion of the structure and the measurement of the natural frequency relative to the Z axis direction can be carried out by using a surface electrode (not shown) disposed on the substrate 11. It is preferable that the natural frequencies of two axes coincide with each other, but the natural frequencies may not coincide within a predetermined scope in design. When the measured natural frequencies are compared with each other resulting in that $f_z$ is higher than $f_x$, the etching operation is performed as shown in FIG. 4A, to reduce the value of the Z-axis spring constant so that $f_z$ can be reduced. On the contrary, the deposition operation is performed as shown in FIG. 4B to increase $f_z$. If the etching or deposition operation is terminated, it is measured whether or not the natural frequency relative to each axis direction is within the scope of a predetermined error, otherwise the operation as above is repeatedly performed.

The method of adjusting the natural frequency of a dual-axes vibratory structure according to the present invention can adjust the natural frequency of the vibratory structure to coincide with a design value so that linearity and the sensitivity of a sensor are improved and operation bandwidth increases. Also, the frequency error of the vibratory structure can be adjusted to improve performances of a gyroscope, an angular velocity sensor and an acceleration sensor using the vibratory structure.

While the present invention is explained with reference to one embodiment shown in drawings, it is understood that a number of alterations can be made by those of ordinary skill in the art. Accordingly, the true scope of protection of the present invention is determined by the scope of the attached claims.

What is claimed is:

1. A method of adjusting the natural frequency of a dual-axis vibratory structure having: a first spring member having a lengthwise direction coinciding to a first axis direction receiving an electrostatic force; a second spring member having a lengthwise direction coinciding to a second direction perpendicular to the first axis direction and having a width narrower than that of the first spring member; and a mass portion, said method comprising the steps of:

measuring the natural frequencies relative to the first axis direction of the vibratory structure and a third axis direction perpendicular to a plane formed by the first and second axes;

varying the thickness of the first spring member so as to adjust the natural frequency of the third axis direction while fixing the natural frequency of the first axis direction; and repeating said measuring step and said thickness varying step until the natural frequencies of the first and third axes directions are within the scope of a permissible error.

2. A method of adjusting the natural frequency of a dual-axis vibratory structure according to claim 1, wherein said thickness-varying step includes the step of decreasing the thickness of the first spring member, when the natural frequency of the third axis direction of the structure is higher than that of the first axis direction.

3. A method of adjusting the natural frequency of a dual-axis vibratory structure according to claim 1, wherein said thickness-varying step includes the step of increasing the thickness of the first spring member, when the natural frequency of the third axis direction of the structure is lower than that of the first axis direction.

4. A method of adjusting the natural frequency of a dual-axis vibratory structure according to claim 2, wherein said thickness-decreasing step is executed by one of reactive ion etching, plasma etching and sputtering.

5. A method of adjusting the natural frequency of a dual-axis vibratory structure according to claim 3, wherein said thickness-increasing step is executed by one of sputtering deposition, ion beam sputtering deposition, electron-cyclotron-resonance sputtering deposition, ion-plating, molecular beam epitaxy, chemical vapor deposition, and metal organic chemical vapor deposition.

6. A method of adjusting the natural frequency of a dual-axis vibratory structure according to claim 1, wherein said thickness-varying step is executed by using a mask formed with an aperture corresponding to a region for realizing a thickness variation in the first spring member and by varying the thickness of the first spring member under the aperture.

7. A method of adjusting the natural frequency of a dual-axis vibratory structure, for use in a gyroscope, having: a first spring member of a first axis direction coinciding with the direction receiving an electrostatic force; a second spring member of a second axis direction perpendicular to the first direction having a width narrower than that of the first spring member; and a mass portion, said method comprising the steps of:

measuring the natural frequency relative to the first axis direction and the third axis direction perpendicular to a plane formed by the first and second axes of the vibratory structure;

varying the thickness of the first spring member of the first axis direction so as to adjust the natural frequency of the third axis direction, while fixing the natural frequency of the first axis direction; and repeating said measuring step and said thickness varying step until the natural frequency of the first axis direction and the third axis direction is within the scope of a permissible error.

* * * * *